Jan. 8, 1963  R. W. BEART  3,072,168
LOCK WASHER
Filed Nov. 25, 1959

INVENTOR.
Robert W. Beart.
BY
Olson & Trexler
ATTY'S

United States Patent Office 3,072,168
Patented Jan. 8, 1963

3,072,168
LOCK WASHER
Robert W. Beart, Park Ridge, Ill., assignor to Illinois Tool Works Inc., a corporation of Delaware
Filed Nov. 25, 1959, Ser. No. 855,381
2 Claims. (Cl. 151—35)

The present invention relates to a novel lock washer for use with rotary fastener elements such as nuts or screws, and more particularly to a novel lock washer of the twisted-tooth type.

Twisted tooth lock washers of prior art known types have generally suffered the common disability of being useful only with workpieces of predetermined hardness and with nuts or screws of predetermined hardness. This situation obtains since the twisted teeth of prior art lock washers are formed with a certain predetermined spring rate or, as in some lock washers heretofore known, have a maximum of two separate spring rates due to two different configurations of teeth. Thus, the teeth have a maximum of two compression rates and two recovery rates.

It is an object of this invention to provide a twisted-tooth type lock washer which is highly versatile and usable with a large range of workpiece materials.

It is a further object of this invention to provide a twisted-tooth type lock washer of aforedescribed characteristics wherein the individual teeth on the lock washer each have a different spring rate to thereby provide a washer with a multiplicity of spring tensions in application.

It is a further object of this invention to provide, at least in certain forms of the invention, a twisted-tooth type lock washer which is relatively non-tracking and eliminates the forming of a relatively deep track or groove in the workpiece of application or the rotary fastener element which is being applied.

Another object of the invention is to provide a novel twisted tooth lock washer which is relatively easy to form by mass production techniques, has a centralized aperture for concentricity and is otherwise well adapted for the purposes for which it is designed.

Other objects and advantages of the present invention will appear from the following description and the accompanying drawings, wherein.

Figure 1:
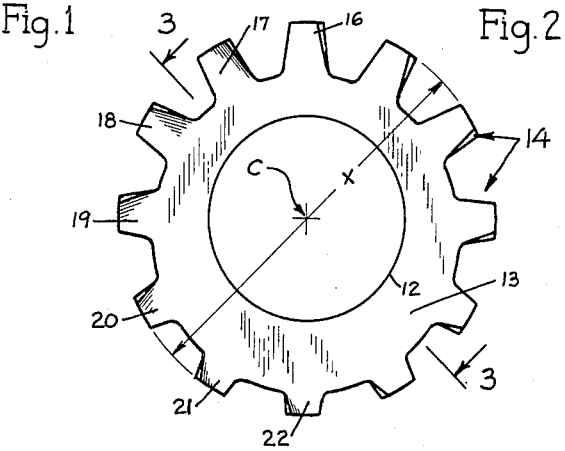
FIG. 1 is a plan view of a novel twisted tooth-type lock washer embodying the principles of this invention.
Figure 2:
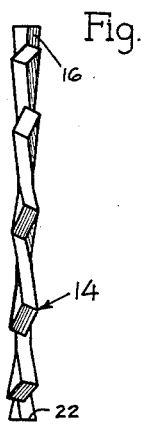
FIG. 2 is a side view of the lock washer shown in FIG. 1.
Figure 3:
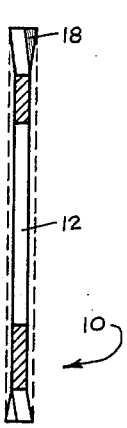
FIG. 3 is a sectional view along line 3—3 of FIG. 1.

Referring now more specifically to the drawings wherein like parts are designated by the same numerals throughout the various figures, a lock washer 10, shown best in FIGS. 1 and 2, is preferably constructed so as to have an outside or largest dimension of predetermined size "X" as shown in FIGS. 1 and 3 which determines the outer diameter of the washer. As shown, the lock washer 10 is generally in the form of an annulus having a centrally located aperture 12. A plurality of teeth 14 are located on the periphery of the lock washer and each half of the lock washer is made up of individual teeth such as 16–22 inclusive as shown in FIG. 1. The individual teeth 14 are preferably tapered in configuration and twisted so as to present edges or surfaces for biting into the workpieces of application as well as to the undersurface of the head of a fastener such as a nut or screw with which the washer is to be associated. These teeth may be of the same or varying height, as desired and disclosed in FIG. 4a.

It will be noted in FIG. 1 that the aperture 12, and the outer periphery of the washer as defined by a line connecting the ends of the teeth are (from a plan view standpoint) two concentric circles. Stated another way, the center C is identical for both the aperture 12 and the center of the circle defined by a line connecting the ends of the teeth. It will be further noted upon close examination, that a line connecting the roots of the individual teeth (which form what may be called a root circumference or periphery) is preferably eccentric relative to the aforedescribed two concentric circles. Thus, the individual teeth 16—22 disposed on each one-half of the washer are all of varying lengths. For example, the tooth 16 is considerably longer than tooth 22, its opposing tooth, on the opposite side of the washer. Also, the next adjacent tooth 17 is not quite as long as tooth 16 but still is considerably longer than tooth 21, and so forth. The varying lengths of the individual teeth assures that the spring rates of the individual twisted teeth are different. The longer teeth have a softer spring rate which provide a compressive rate, as well as a recovery rate, considerably different than the shorter, stubbier teeth such as 22. Obviously, the spring rates vary successively from tooth to tooth.

Figure 4:
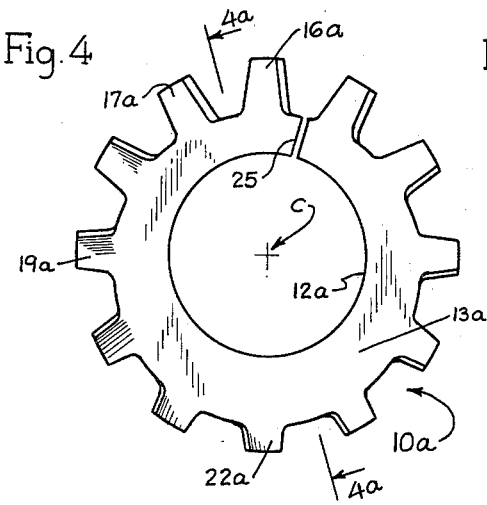
FIG. 4 is a plan view of an alternate embodiment of this invention.
Figure 4A:
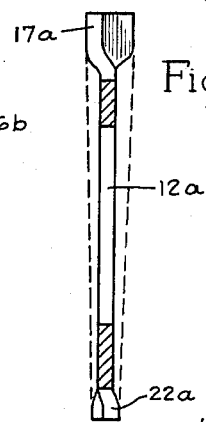
FIG. 4a is a sectional view along line 4a—4a of FIG. 4.

The embodiment of the invention shown in FIG. 4 of the drawings is substantially similar to that shown in FIG. 1 and the like parts shall be identified by the same numeral with the suffix "a" added. The essential difference of the embodiment of the washer 10a over the washer 10 is that the washer is split at 25 and the individual teeth are formed with a varying deformation from the major plane of the washer as shown in FIG. 4a. Also the individual teeth are twisted in a so-called "line bite" form so that a greater portion of each of the individual teeth impinges upon the work surface as compared to tapered twisted form. Thus, the washer illustrated in FIG. 4, in addition to having a varying spring rate on the various teeth, also provides a non-tracking type of washer wherein varying amounts of tooth contact are provided since the engaging surfaces of the various individual teeth are not concentric about the center of the 12a aperture.

Further, since the larger teeth such as 16a and 17a project from the major plane of the washer (as defined by a plane passing through the mid-portion of body 13) a further distance than the shorter teeth such as 22a, they will engage the workpiece prior to the short teeth on compression thereof. It is apparent that this construction affords a wide range of tolerances in application. It will also be apparent that in this particular type of washer (or any of the disclosed washers) that the aperture 12a may be offset to the left or right from the position shown in FIG. 4 to provide a washer wherein every tooth would be of a different length thereby the spring rate and engagement characteristics of the various teeth would all be different instead of paired.

Figure 5:
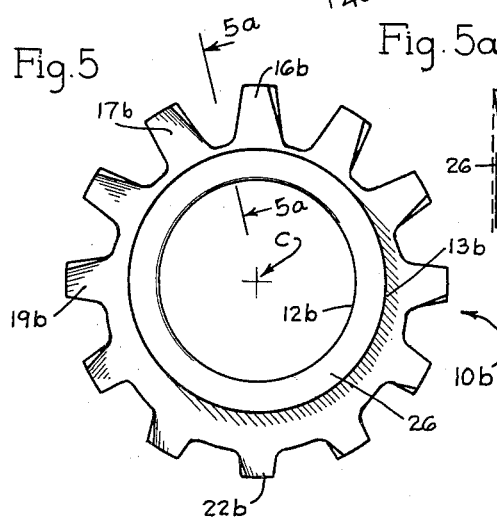
FIG. 5 is a plan view of another alternate embodiment of this invention.
Figure 5A:
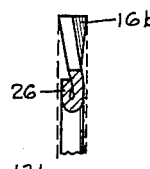
FIG. 5a is a sectional view along the line 5a—5a of FIG. 5.

The embodiment shown in FIG. 5 is substantially similar to the foregoing except that the washer is essentially designed for very small sizes. Similar parts will be identified with similar numerals with the addition of the suffix "b." In washer 10b a rim or collar 26 has been formed by extrusion and then compression to provide a double thickness in the vicinity of the aperture 12b. This is important in small sizes of washers since the washer stock adjacent the longer teeth such as 16b and 17b would, being of minor dimensional measurement, buckle prior to compression of the teeth to their fullest extent providing a collar or rim 26 is not employed. The rim 26 prevents this buckling tendency and thus washers having the benefits aforementioned may be made in very small sizes. Further, the thickened rim provides an abutment to prevent the deflected teeth 16b from being compressed beyond the double thickness of the stock.

Figure 6:
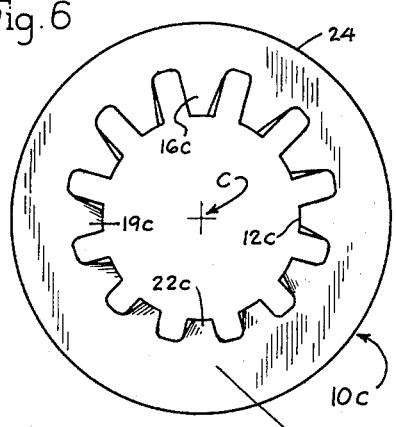
FIG. 6 is a plan view of still another alternative embodiment of this invention.

The embodiment shown in FIG. 6 of the drawings is generally similar to what has been described hereinbefore except that this type of toothed lock washer is one with radially inwardly directed teeth, whereas the foregoing have been shown with radially outwardly directed teeth. Essentially, the lock washer contains the same elements as previous embodiments. Therefore, similar parts have been identified with the suffixe "c." As shown in FIG. 6, the lock washer 10c has a root diameter (a line connecting the roots of the individual teeth) which is offset or eccentric relative to the inner aperture 12c defined by a line connecting the ends of the teeth. In this embodiment, the outer periphery of the lock washer 24 is concentric with the inner aperture 12c defined by the ends of the teeth and the root periphery is offset and eccentric with these two circles. It will also be apparent that the configurations shown in FIGS. 4 and 5 may be turned "inside out" to provide radially inwardly directed toothed lock washers if desired.

While I have shown and described certain embodiments of my invention, it is with full awareness that many modifications thereof are possible. Therefore, my invention is not to be restricted except as is required by the prior art and the spirit of the appended claims.

What is claimed as this invention is:

1. A lock washer comprised of sheet metal including an annular body portion having a comparatively substantially uniform cross sectional thickness as measured in successive radial planes extending axially through said body portion, and a plurality of prongs of substantially equal width extending radially from and substantially entirely around the periphery of said body portion, said individual prongs being twisted about an axis in a manner to provide portions extending on both sides of the bounding planes of said washer body portion to define teeth adapted for locking engagement with work surfaces disposed on both sides of said washer, the free extremities of said prongs positioned along a line defining a first periphery substantially concentric with the washer axis, the roots of said prongs positioned along a line defined a second periphery which is substantially eccentric with respect to the washer axis, and the margin of said body oppositely disposed from said prongs defining a third periphery concentric with the washer axis and of substantially similar configuration to the configuration of said first periphery, whereby when a washer is clamped between work surfaces said locking teeth will resist clamping forces with varying degrees of resiliency.

2. A lock washer of the type set forth in claim 1 wherein the lines defining said first and third peripheries are substantially circular in configuration.

References Cited in the file of this patent

UNITED STATES PATENTS

| | | |
|---|---|---|
| 925,899 | Hall | June 22, 1909 |
| 2,250,050 | Olson | July 22, 1941 |
| 2,297,261 | Thode | Sept. 29, 1942 |
| 2,636,253 | Rees | Apr. 28, 1953 |
| 2,707,012 | Cox | Apr. 26, 1955 |
| 2,886,382 | Baublys | May 12, 1959 |

FOREIGN PATENTS

| | | |
|---|---|---|
| 469,369 | Great Britain | July 23, 1937 |